United States Patent [19]

Rykowski

[11] 4,179,537

[45] Dec. 18, 1979

[54] SILANE COUPLING AGENTS

[76] Inventor: John J. Rykowski, 1026 S. Fircroft St., West Covina, Calif. 91791

[21] Appl. No.: 866,877

[22] Filed: Jan. 4, 1978

[51] Int. Cl.$^2$ ............... B05D 1/36; B32D 17/10; C07F 7/18

[52] U.S. Cl. ............... 427/387; 106/287.16; 427/333; 427/340; 427/342

[58] Field of Search ............... 427/387, 333, 340, 342; 106/287.16

[56] References Cited

U.S. PATENT DOCUMENTS

| | | | |
|---|---|---|---|
| 3,702,783 | 11/1972 | Hartlein | 428/391 |
| 3,816,235 | 6/1974 | Lin | 428/391 |
| 3,944,707 | 3/1976 | Foley et al. | 427/387 X |
| 3,993,837 | 11/1976 | Foley et al. | 428/391 |
| 4,049,865 | 9/1977 | Maaghul | 428/391 X |
| 4,130,677 | 12/1978 | Huntsberger | 427/387 X |

*Primary Examiner*—James R. Hoffman
*Attorney, Agent, or Firm*—Christie, Parker & Hale

[57] ABSTRACT

The adhesion of inorganic substrates such as glass, silica, clay, alumina, or steel, to organic resins such as polysulfides, polyolefins, polyesters, polyurethanes, epoxy resins, or EPDM rubber is improved with the use of compositions comprising from about 5 to 95 weight percent of a component selected from a first group consisting of methacryloxyalkyltrialkoxysilanes, mercaptoalkyltrialkoxysilanes, vinyltrialkoxysilanes, vinyltrihalosilanes, and alkylvinyldihalosilanes wherein each alkyl or alkoxy group has 1 to 3 carbon atoms inclusive, and from about 5 to 95 weight percent of a second component selected from a second group consisting of alkyltrialkoxysilanes, dialkyldialkoxysilanes, trialkylalkoxysilanes, trialkoxysilanes, tetraalkoxysilanes, aryltrialkoxysilanes, alkylaryldialkoxysilanes, and diaryldialkoxysilanes, wherein each aryl group is phenyl or para-tolyl, each alkyl group has 1 to 8 carbon atoms inclusive, and each alkoxy group has 1 to 3 carbon atoms inclusive.

20 Claims, No Drawings

4,179,537

SILANE COUPLING AGENTS

BACKGROUND

This invention relates to improved silane coupling agents. One aspect of the invention relates to sizing compositions for glass fibers that give improved hand and stiffness to sized fiberglass strand, roving, and fabric and improved bonding of such materials to ethylenically unsaturated resins, such as polyesters, when such resins are cured in contact with sized glass fibers.

Organofunctional silanes such as epoxy, amino, mercapto, vinyl, acrylic, and methacrylic functional silanes having at least one readily hydrolyzable group such as an alkoxy or a halogen group, usually two or three such hydrolyzable groups, are known. Such organofunctional silanes have one functional group capable of reacting with an organic resin, and one or more hydrolyzable groups capable of bonding to an inorganic substrate such as silica, fiberglass, or steel. Such coupling agents improve adhesion or bonding between a cured organic matrix and the inorganic substrate and also permit higher loading of finely divided fillers without an excessive loss in the strength of the cured composition. Blends of two or more of such organofunctional silanes, wherein both silanes are reactive with an organic resin, have been described.

In addition, U.S. Pat. No. 3,702,783 to Hartlein describes a blend of an epoxy functional silane, 3-glycidoxypropyl-trimethoxysilane, with an alkyl silane, methyltrimethoxy-silane, for bonding glass to epoxy resins, amino resins, polyamides, and polyacrylates. The methyltrimethoxy-silane is not reactive with the organic resins through its methyl substituent, but is believed to be reactive with such resins through its hydrolyzable methoxy substituents in the presence of an epoxy-functional silane. Thus, the patent describes a blend of two silanes, both of which are reactive with the organic resins with which the silanes are disclosed for use.

U.S. Pat. No. 3,816,235 to Lin discloses a silane coupling agent comprising an N-(2-aminoethyl)-3-aminopropylsilane having three hydrolyzable groups with an alkyl silane such as methyltriethoxysilane for use in a glass fiber sizing composition that also includes a resin formed of maleic anhydride and a conjugated diene, an alkyl acrylate or methacrylate, or a vinyl aromatic monomer. It is believed that the methyltrialthoxysilane is reactive through its ethoxy substituents with the organic resins, particularly resorcinol-aldehyde resins, with which the silanes are disclosed for use.

In the systems described in the two aforesaid patents, it is believed that functional groups that are reactive with alkoxysilanes, such as hydroxyl groups, are present in the organic matrix before or during cure, and that the alkyl-trialkoxysilane components of the blended coupling agents are therefore capable of reacting with the organic matrix.

SUMMARY OF THE INVENTION

The present invention provides novel blends of silanes for use as coupling agents, coatings, sizings, and primers in a variety of organic polymer systems. In one aspect, compositions of this invention comprise from about 5 to 95 weight percent of a component selected from a first group consisting of acryloxyalkyltrialkoxy silanes, methacryloxyalkyltrialkoxysilanes, mercaptoalkyltrialkoxysilanes, vinyltrialkoxysilanes, vinyltrihalosilanes, and alkylvinyldihalosilanes wherein each alkyl or alkoxy group has 1 to 3 carbon atoms inclusive, and from about 5 to 95 weight percent of a second component selected from a second group consisting of alkyltrialkoxysilanes, dialkyldialkoxysilanes, trialkylalkoxysilanes, trialkoxysilanes, tetraalkoxysilanes, aryltrialkoxysilanes, alkylaryldialkoxysilanes, and diaryldialkoxysilanes, wherein each aryl group is phenyl, chlorophenyl, or para-tolyl, each alkyl group and 1 to 8 carbon atoms inclusive, and each alkoxy group has 1 to 3 carbon atoms inclusive. Preferably, the compositions comprise from about 25 to 75 weight percent of the first component and from about 25 to 75 weight percent of the second component. Corresponding silanes having acyloxy groups of 1 to 3 carbons in place of one or more alkoxy groups are also included.

Compositions of the present invention may include more than one component from the first group, or from the second group, or from both groups, the total of components from the first group being from about 5 to 95 weight percent, preferably from about 25 to 75 weight percent, of the composition, and the total of components from the second group being from about 5 to 95 weight percent, preferably from about 27 to 75 weight percent, of the composition. Such compositions preferably comprise at least one component from the first group and at least two alkoxy-substituted components from the second group, said two components having different numbers of alkoxy substituents. Thus, for example, the two components from the second group may include a diorganodialkoxy silane and an organotrialkoxysilane, or a diorganodialkoxysilane and a triorganoalkoxysilane, or a diorganodialkoxysilane and a tetraalkoxysilane. The various alkyl and alkoxy substituents of components of a composition of this invention have the same number of carbons or different numbers of carbons.

In another aspect of the invention, a sizing composition for glass, particularly for fiberglass strand, roving, and fabric, is disclosed. The composition comprises from about 5 to about 95 weight percent of a first component selected from a first group consisting of gamma-methacryloxy-propyltrimethoxysilane, gamma-mercaptopropyltrimethoxysilane, gamma-methacryloxypropyl-tris(2-methoxyethoxy)silane, vinyl-tris(2-methoxyethoxy)silane, vinyltrichlorosilane, mercaptoethyltriethoxysilane, and methylvinyldichlorosilane, and from about 5 to 95 weight percent of a second component having hydrolyzable alkoxy or acyloxy groups selected from a second group consisting of methyltrimethoxysilane, dimethyldimethoxysilane, trimethylmethoxysilane, methyltriethoxysilane, methyl-tris(isopropxy)silane, phenyltrimethoxysilane, methylphenyldimethoxysilane, diphenyldimethoxysilane, methyl-tris(2-methoxyethoxy)silane, trimethoxysilane, methyltriacetoxysilane, ethyltriethoxysilane, octyltrimethoxysilane, gamma-chloropropyltrimethoxysilane, para-tolyltrimethoxsilane, beta-chloroethyltriethoxysilane, and tetraethoxysilane. Preferably, the composition comprises from about 5 to 95 weight percent of a methacryloxyalkyl-trialkoxysilane, and from about 5 to 95 weight percent of an alkyltrialkoxysilane, each alkyl or alkoxy group having 1 to 3 carbon atoms. In addition, the composition may comprise up to about 10 weight percent of a tetraalkoxysilane, notably tetraethoxysilane. The composition gives improved hand and stiffness to sized fiberglass material, and improved bonding to ethylenically unsaturated resins which are cured in contact with the sized fiberglass.

DETAILED DESCRIPTION

The present invention provides improved silane coupling agent compositions comprising a blend of a first component which is an organofunctional silane having hydrolyzable alkoxy, acyloxy, or halogen substituents, wherein the organofunctional group may be an acryloxyalkyl group, a methacryloxyalkyl group, a mercaptoaklyl group, or a vinyl group, and a second component which is a silane having 1 to 4 alkoxy substituents, any non-alkoxy substituents being alkyl, haloaryl, haloalkyl, or aryl substituents which contain only carbon, hydrogen, and halogen, and are thus not organofunctional substituents as the term is used herein. Such compositions can be used to treat an inorganic substrate, or can be incorporated into an organic resin, to improve adhesion between the inorganic substrate and the resin when the resin is cured in contact with the substrate. Such compositions are also useful as coatings for finely divided fillers, and as primers for siliceous and metallic substrates.

The organofunctional silanes themselves are known as coupling agents for use with many combinations of inorganic substrates and organic resins. Compositions of the present invention including such organofunctional silanes can be used with any of the known combinations of inorganic substrates and organic resins with which the organofunctional silanes themselves can be used. Specifically, vinyl, acryloxyalkyl, and methacryloxyalkyl functional silanes are useful for improving the bonding of siliceous substrates such as glass, fiberglass, quartz, silica, clay, etc. with ethylenically unsaturated resins including unsaturated polyesters such as unsaturated phthalic anhydride esters, acrylates, and methacrylates; with thermoplastic polyolefins such as polyethylene, polystyrene, and polyvinyl chloride; and with elastomers such as EPDM rubber. Mercaptoalkyl silanes are useful in improving the bonding of glass or metals to polysulfides and to sulfurcured rubbers such as natural and synthetic rubbers. Other useful combinations are known.

Organofunctional silanes useful in practice of this invention are known in the art and include acryloxyalkyl-trialkoxysilanes, methacryloxyalkyltrialkoxysilanes, mercaptoalkyltrialkoxysilanes, vinyltrialkoxysilanes, vinyltrihalosilanes, and alkylvinyldihalosilanes wherein each alkyl, substituted alkyl, or alkoxy group has 1 to 3 carbon atoms independently of any substituent. Such alkyl and substituted alkyl groups include methyl, ethyl, 2-chloropropyl groups, and the organofunctionally substituted alkyl groups, including acryloxymethyl, 2-methacryloxyethyl, 2-mercaptoethyl, and 3-mercaptopropyl groups. Specific alkoxy groups include methoxy, ethoxy, n-propyloxy, isopropyloxy, and 2-methoxyethoxy groups. Specific examples of such organofunctional silanes include gamma-methacryloxypropyltrimethoxysilane, gamma-mercaptopropyltrimethoxysilane, vinyl-tris(2-methoxyethoxy) silane, vinyl-trichlorosilane, mercaptoethyltriethoxysilane, and methylvinyldichlorosilane.

Useful silanes having 1 to 4 hydrolyzable alkoxy substituents include tetraalkoxysilanes in which the alkoxy groups have 1 to 3 carbons, and mono-,di-, and trialkoxysilanes having in addition hydrogen, alkyl, haloalkyl, aryl, or haloaryl substituents containing only carbon, hydrogen, or halogen, the alkyl and haloalklyl substituents having 1 to 3 carbons, and the aryl substituent having 6 to 7 carbons. Such substituents are not organofunctional as the term is used herein, i.e., they are not reactive with the organic resin during cure. Such silanes include alkyltrialkoxysilanes, dialkyldialkoxysilanes, trialkylalkoxysilanes, trialkoxysilanes, tetraalkoxysilanes, aryltrialkoxysilanes, alkylaryldialkoxysilanes, alkyltriacyloxysilanes, and diaryldialkoxysilanes wherein each aryl is phenyl, chlorophenyl, or para-tolyl, each alkyl group has 1 to 8 carbon atoms inclusive, and each alkoxy or acyloxy group has 1 to 3 carbon atoms inclusive. Specific examples of such silanes which are useful as the second component in practice of this invention include methyltrimethoxysilane, dimethyldimethoxysilane, trimethylmethoxysilane, methylmethoxy-di(2-methoxyethoxy)silane, methyltriethoxysilane, methyl-tris(isopropoxy) silane, phenyltrimethoxysilane, methylphenyldimethoxysilane, diphenyldimethoxysilane, methyl-tris(2-methoxyethoxy)silane, methyltriacetoxysilane, trimethoxysilane, ethyltriethoxysilane, octyltrimethoxysilane, gamma-chloropropyltrimethoxysilane, para-tolyltrimethoxysilane, beta-chloroethyltriethoxysilane, and tetraethoxysilane.

Methods of making the organofunctional silanes of the first group and the silanes of the second group are well known in the art. Most specifically named silanes are commercially available.

Compositions of this invention may include one or more of said first components totaling from about 5 to 95, preferably from about 25 to 75, weight percent of the composition and one or more of said second components totaling from about 5 to 95, preferably from about 25 to 75, weight percent of the composition. Preferably, at least two of said second components are included, each of which has a different number or kind of hydrolyzable substituents or of alkyl or aryl substituents so that the properties of the composition may be adjusted precisely for a specific use.

In another embodiment of the invention, at least two of said first components are included, the rate of hydrolysis of hydrolyzable substituents on one of said first components being different from the rate of hydrolysis of hydrolyzable substituents on another of said first components. For example, one of said first components may have halogen substituents and another alkoxy substituents, or one may have alkoxy substituents having one number of carbons and another may have alkoxy substituents having a different number of carbons. One first component may have alkoxy substituents such as ethoxy, and another first component may have alkoxyether substituents such as ethoxymethoxy or 2-methoxyethoxy substituents. Alternatively, one first components having hydrolyzable substituents having differing rates of hydrolysis may be used. It is believed that using two first components or one first component having substituents having differing rates of hydrolysis produces a silane composition having a lesser tendency to form siloxane oligomers, and therefore having a greater coupling efficiency, than a silane composition having a first component in which all the hydrolyzable substituents have substantially the same rate of hydrolysis.

Silane compositions of this invention can be applied directly or in solution, dispersion, or emulsion in an inert organic solvent such as xylene or in an alcohol or water. They may be applied directly to a substrate such as glass, glass fiber, silica, steel, aluminum, etc., by spraying, dipping, or the like, or they may be incorporated into the organic resin. They may be incorporated into sizing compositions with water or an organic solvent, glass fiber lubricants such as polyethylene glycols and fatty acid esters thereof, film forming binders such as polyvinylalcohol, polyvinylacetate, polyvinyl pyrollidone, epoxy resin emulsion, and the like.

The present invention provides improved silane compositions comprising an organofunctional silane and another, nonorganofunctional silane which provide reinforced materials, such as fiberglass reinforced laminates, have strength equal to that provided by an equal weight of the organofunctional silane alone, which can impart improved hand or stiffness to sized fiberglass, and which cost less than the pure organofunctional silane.

A particularly preferred embodiment of this invention is a silane composition for improving adhesion between glass, especially fiberglass, and ethylenically unsaturated resins, the composition comprising from about 5 to 95, preferably from about 25 to 75, weight percent of a methacryloxyalkyltrialkoxysilane and from about 5 to 95, preferably from about 25 to 75, weight percent of an alkyltrialkoxysilane, wherein the alkyl and alkoxy groups have 1 to 3 carbon atoms. In addition, up to about 10 weight percent of a tetraalkoxysilane, in which the alkoxy groups have 1 to 3 carbons, can be used. Such a composition is described below in Example 1.

The following examples will serve to illustrate practice of the present invention.

EXAMPLE 1

A composition of the present invention, designated below as Formulation I, was prepared containing:

| Ingredient | Weight Percent |
| --- | --- |
| gamma-Methacryloxypropyltrimethoxysilane | 49.3 |
| Methyltrimethoxysilane | 44.4 |
| Tetraethoxysilane | 6.3 |

Two glass sizings A and B, were prepared as follows:

| Ingredient | A Weight Percent | B Weight Percent |
| --- | --- | --- |
| Glacial acetic acid | 0.25 | 0.25 |
| Formulation I | 0.50 | — |
| gamma-Methacryloxypropyltrimethoxysilane | — | 0.50 |
| Distilled water | 99.25 | 99.25 |

Patches of heat cleaned fiberglass cloth, style 181, were dipped in the sizings and dried for one hour at 235 F. Twelve ply laminates were prepared using the sized cloth patches and the following laminating resin:

| Ingredient | Parts by weight |
| --- | --- |
| Unsaturated polyester Resin[1] | 90 |
| Styrene | 9 |
| 50% Benzoyl Peroxide in Tricresyl Phosphate | 2 |

[1]An unsaturated phthalic anhydride resin from Rohm and Haas

The laminates were pressed to a thickness of 0.125 inch and cured for one hour at 250# F. Glass content of both laminates was 74 weight percent. The following ultimate flexural strengths were measured on 4 inch by 1 inch by 0.125 inch test coupons after curing with no after treatment and after 48 hours immersion in boilling water.

| | Ultimate Flexural Strength(PSI) | |
| --- | --- | --- |
| Glass Sizing | Dry | After 48 hours in Boiling Water |
| A (containing Formulation I) | 72,300 | 46,800 |
| B | 71,600 | 46,000 |

Within the limits of accuracy of the measurement, sizings A and B give equivalent strength to the laminates. However, sizing A gave the sized glass cloth superior hand, a property which renders the cloth easier to manipulate when a laminate or other article is being fabricated from the cloth. In addition, sizing A is lower in cost than sizing B because it contains less of the more expensive gamma-methacryloxypropyl silane.

EXAMPLE 2

The following glass sizings, C and D, were prepared:

| Ingredient | C weight percent | D weight percent |
| --- | --- | --- |
| Glacial acetic acid | 0.25 | 0.25 |
| Formulation I[1] | 0.50 | — |
| gamma-Methacryloxypropyltrimethoxysilane | — | 0.50 |
| N-(2-aminoethyl)-3-aminopropyltrimethoxysilane | 0.20 | 0.20 |
| Epoxy Emulsion | 6.00 | 6.00 |
| Lubricant(polyethylene glycol monolaurate) | 0.20 | 0.20 |
| Film former (low molecular weight polyvinyl pyrollidone) | 0.70 | 0.70 |
| Distilled water | to 100% | to 100% |

[1]As in Example 1
[2]J-Coat 52, a bisphenol A type epoxy resin emulsified with a nonionic emulsifier, epoxide equivalent weight about 400, from Jay Chemnical Company, Glendora, CA 91740.

These sizings were used to finish freshly formed glass fibers which were processed into continuous roving packages. The rovings were used to prepare N.O.L. short beam shear ring test specimens, using the following resin:

| Ingredient | Parts by weight |
| --- | --- |
| Vinyl Ester Resin[1] | 100 |
| 50% Benzoyl peroxide in Tricresyl Phosphate | 2 | the test specimens were cured for one hour at 200 F. The following test results were obtained after curing, with no after treatment and after 28 days immersion in boiling water:

| | Ultimate Shear Strength, (PSI) | |
| --- | --- | --- |
| Glass Sizing | Dry | After 28 Days in Boiling Water |
| C (containing Formulation I) | 9700 | 8100 |
| D | 9725 | 8050 |

Roving sized with C was stiffer than roving sized with D, a property which improves the performance of roving in chopping operations by giving the bundle of fibers greater integrity for cleaner chopping.

| Ingredient | Weight percent |
|---|---|
| Vinyl-tris(2-methoxyethoxy)silane | 43 |
| Methyl-tris(2-methoxyethoxy)silane | 39 |
| gamma-Chloropropyltrimethoxysilane | 18 |

This formulation is dry blended with alumina trihydrate. The resulting coated alumina trihydrate can be added to unsaturated polyester resins to improve the flame retardancy of the cured polyester. Such coated alumina trihydrate increases the viscosity of the resin less than uncoated alumina trihydrate, thus permitting higher loadings for improved flame retardancy and lower cost.

EXAMPLE 7

| Ingredient | Weight percent |
|---|---|
| gamma-Methacryloxypropylmethoxydi (2-methoxyethoxy)silane | 60 |
| Methyltrimethoxysilane | 34 |
| Phenyltrimethylsilane | 6 |

This formulation may be incorporated in fiberglass sizings for making roving, such as:

| Ingredient | Weight percent |
|---|---|
| Water | 50 |
| Glacial acetic acid | 0.20 |
| Formulation of Example 7, above | 0.50 |
| Second Coupling Agent[2] | 0.20 |
| Epoxy Emulsion | 6.00 |
| Lubricant (Polyethylene Glycol monostearate; M.W. 400) | 0.40 |
| Water | to 100% |

[1]J-Coat 52
[2]Coupling agent of

| Ingredient | Weight percent |
|---|---|
| N-(2-aminoethyl)-3-aminopropyltrimethoxysilane | 35 |
| Morpholine | 15 |
| Dimethyldimethoxysilane | 5 |

This sizing composition is useful for treating freshly formed glass fibers for winding into direct wound packages or roving packages. Such roving is useful for making polyester tanks and epoxy pipes.

Numerous variations of compositions within the scope of this invention will be apparent to those skilled in the art. Although the present invention has been described with reference to particular details and embodiments thereof, the particulars are not intended to limit the invention, the scope of which is defined in the following claims:

What is claimed is:

1. A coating composition for improving adhesion between an organic matrix and an inorganic substrate. which comprises:
from about 5 to 95 weight percent of a component selected from a first group consisting of methacryloxyalkyltrialkoxysilanes, mercaptoalkyltrialkoxysilanes, vinyltrialkoxysilanes, vinyltrihalosilanes, and alkylvinyldihalosilanes wherein each alkyl or alkoxy group has 1 to 3 carbon atoms inclusive, and from about 5 to 95 weight percent of a second component selected from a second group consisting of alkyltrialkoxysilanes, dialkyldialkoxysilanes, trialkylalkoxysilanes, trialkoxysilanes, tetraalkoxysilanes, aryltrialkoxysilanes, alkylaryldialkoxysilanes, and diaryldialkoxysilanes, wherein each aryl group is phenyl, chlorophenyl or or paratolyl, and each alkyl group has 1 to 8 carbon atoms inclusive, and each alkoxy group has 1 to 3 carbon atoms inclusive.

2. A composition of claim 1 comprising at least two alkoxy-substituted components from the second group, said two components having different numbers of alkoxy substituents.

3. A coating composition for improving adhesion between an organic matrix and an inorganic substrate which comprises:
from about 5 to about 95 weight percent of a first component selected from a first group consisting of gamma-methacryloxypropyltrimethoxysilane, gamma-methacryloxypropyl-tris(2-methoxyethoxy)silane, gamma-mercaptopropyltrimethoxysilane, vinyl-tris(2-methoxyethoxy) silane, vinyltrichlorosilane, mercaptoethyltriethoxysilane, and methylvinyldichlorosilane, and from about 5 to 95 weight percent of a second component selected from a second group consisting of methyltrimethoxysilane, dimethyldimethoxysilane, trimethylmethoxysilane, methyltriethoxysilane, methyl-tris(isopropoxy) silane phenyltrimethoxysilane, methylphenyldimethoxysilane, diphenyldimethoxysilane, methyl-tris(2-methoxyethoxy) silane, trimethoxysilane, ethyl triethoxysilane, octyltrimethoxysilane, gamma-chloropropyltrimethoxysilane, para-tolyltrimethoxysilane, beta-chlorethyltriethoxysilane, and tetraethoxysilane.

4. A composition of claim 3 comprising at least two alkoxy-substituted components from the second group, said two components having different numbers of alkoxy substituents.

5. A coating composition for improving adhesion between glass and ethylenically unsaturated resin comprising from about 5 to 95 weight percent of a methacryloxyalkyltrialkoxysilane, and from about 5 to 95 weight percent of alkyltrialkoxysilane from about 5 to 95 weight percent of alkyltrialkoxysilane, each alkyl or alkoxy group having 1 to 3 carbon atoms.

6. The composition of claim 5 further comprising up to about 10 weight percent of a tetraalkoxysilane.

7. The composition of claim 6 wherein the tetraalkoxysilane is tetraethoxysilane.

8. The composition of claim 5 which comprises from about 25 to 75 weight percent of gamma-methacryloxypropyltrimethoxysilane and from about 25 to 75 weight percent of methyltrimethoxysilane.

9. A method for improving adhesion between glass and a polymerizate of an ethylenically unsaturated resin which comprises:
treating glass with a solution of a silane composition, the composition comprising from about 5 to 95 weight percent of a methacryloxyalkyltrialkoxysilane and from about 5 to 95 weight percent of an alkyltrialkoxysilane, each alkyl or alkoxy group having 1 to 3 carbon atoms;
contacting treated glass with an ethylenically unsaturated resin, and
curing the resin to provide a solid material having said glass bonded thereto.

10. A method as recited in claim 9 wherein the silane composition comprises from about 25 to 75 weight percent of gamma-methacryloxypropyltrimethoxysilane and from about 25 to 75 weight percent of methyltrimethoxysilane.

11. A method as recited in claim 9 wherein the treating composition further comprises up to about 10 weight percent of tetraethoxysilane.

12. A method as recited in claim 9 wherein the glass is fiberglass and the resin is a polyester.

13. A silane composition from about 5 to 95 weight percent of an organofunctional component having hydrolyzable halogen, acyloxy or alkoxy substituents, the component being selected from a first group consisting of acryloxyalkltrialkoxysilanes, methacryloxyalkyltrialkoxysilanes, mercaptoalkyltrialkoxysilanes, vinyltrialkoxysilanes, vinyltrihalosilanes, vinyltriacyloxysilanes and alkylvinyldihalosilanes wherein each alkyl, alkoxy, or acyloxy group has 1 to 3 carbon atoms inclusive, and from about 5 to 95 weight percent of a second component selected from a second group consisting of alkyltrialkoxysilanes, dialkyldialkoxysilanes, trialkylalkoxysilanes, trialkoxysilanes, tetraalkoxysilanes, aryltrialkoxysilanes, alkylaryldialkoxysilanes, and diaryldialkoxysilanes, wherein each aryl group is phenyl, chlorophenyl, or para-tolyl, each alkyl group has 1 to 8 carbon atoms inclusive, and each alkoxy group has 1 to 3 carbon atoms inclusive.

14. A silane composition of claim 13 which comprises from about 25 to 75 weight percent of the first component and from about 25 to 75 weight percent of the second component.

15. A silane composition of claim 13 which comprises at least two of said second components, each having a different number of alkoxy groups.

16. A silane composition of claim 15 wherein one of said second components has two alkoxy groups and another of said second components has four alkoxy groups.

17. A silane composition of claim 13 which comprises a component having at least two hydrolyzable substituents having differing rate of hydrolysis.

18. A silane composition of claim 17 wherein at least two hydrolyzable substituents are alkoxy groups having differing numbers of carbons.

19. A silane composition of claim 17 wherein one of the at least two hydrolyzable substituents is an alkoxy group and the other is an alkoxyether group.

20. A silane composition of claim 13, in which the rate of hydrolysis of hydrolyzable substituents on one of said components is different from the rate of hydrolysis of hydrolyzable substituents on another of said components.

* * * * *